US006209659B1

(12) United States Patent
Blessing

(10) Patent No.: US 6,209,659 B1
(45) Date of Patent: Apr. 3, 2001

(54) HAND-HELD DRILL WITH A COMPRESSED AIR-OPERATED HAMMER MECHANISM

(75) Inventor: Matthias Blessing, Feldkirch-Tosters (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/357,437

(22) Filed: Jul. 20, 1999

(30) Foreign Application Priority Data

Jul. 22, 1998 (DE) ............................................ 198 32 946

(51) Int. Cl.[7] ...................................................... B23B 9/00

(52) U.S. Cl. ......................... 173/201; 173/109; 173/127; 173/136; 173/138; 173/162.1; 173/207

(58) Field of Search .................................... 173/201, 206, 173/207, 138, 127, 135, 162.1, 109, 136, 48; 91/229, 224, 227

(56) References Cited

U.S. PATENT DOCUMENTS

| | | | | |
|---|---|---|---|---|
| 450,782 | * | 4/1891 | Laun | 173/127 |
| 682,492 | * | 9/1901 | Payton | 173/136 |
| 2,210,020 | * | 8/1940 | Anderson | 173/127 |
| 2,748,751 | * | 6/1956 | Johnson | 173/207 |
| 3,010,439 | * | 11/1961 | Mee et al. | 91/229 |
| 4,286,929 | * | 9/1981 | Heath et al. | 91/229 |
| 4,506,742 | * | 3/1985 | Fukase | 173/138 |
| 4,846,634 | * | 7/1989 | Vos et al. | 91/229 |
| 5,269,382 | * | 12/1993 | Ottestad | 173/206 |
| 5,775,440 | * | 7/1998 | Shinma | 173/201 |
| 5,816,341 | * | 10/1998 | Bone et al. | 173/201 |

* cited by examiner

*Primary Examiner*—Peter Vo
*Assistant Examiner*—Jim Calve
(74) *Attorney, Agent, or Firm*—Brown & Wood, LLP

(57) ABSTRACT

A hand drill including a housing (2), a rotary drive (8–15) arranged in the housing (2) for driving a chuck (6) provided at a front, in the drilling direction, end of the housing and in which a drill or a chisel tool is received, a compressed air-operated hammer mechanism having a pneumatic cylinder (22), a die member (15) for imparting axial blows to the drill or chisel tool, and a percussion piston (30) displaceable in the pneumatic cylinder 922) upon being impinged by compressed air for intermittently applying axial blows to the die member (15), and a reversing valve for connecting the hammer mechanism (22) with a source of compressed air, integrated in the percussion piston (30), and having a plurality of recesses and bores (46–52) alternatively operationally connectable with at least one inlet opening (23) and at least one discharge opening (24) of the pneumatic cylinder (22) for feeding the compressed air into the pneumatic cylinder (22) and for discharging the compressed air therefrom.

6 Claims, 3 Drawing Sheets

HAND-HELD DRILL WITH A COMPRESSED AIR-OPERATED HAMMER MECHANISM

BACKGROUND OF THE INVENTION

1. Field of the Invention

The present invention relates to a hand drill including a housing, a chuck provided at a front, in a drilling direction, end of the housing for receiving a drill or chisel tool, a rotary drive arranged inside the housing for driving the chuck, together with the drill or chisel tool, a compressed air-operated hammer mechanism for generating axial blows to be applied to the drill or chisel tool and having a pneumatic cylinder with at least one inlet opening and at least one discharge opening, a die member for imparting the axial blows, which are generated by the hammer mechanism, to the drill or chisel tool and extending through a front limiting surface of the pneumatic cylinder, and a percussion piston displaceable in the pneumatic cylinder upon being impinged by compressed air for intermittently applying axial blows to the die member, and a reversing valve for connecting the hammer mechanism with a source of compressed air.

2. Description of the Prior Art

In addition to hand-held drills provided with electro-pneumatic hammer mechanisms or mechanical hammer mechanisms such as ratchet hammer mechanisms, spring-actuated hammer mechanisms and cushioned cam hammer mechanisms, also are used hand-held drills having a compressed air-operated or servo-pneumatic hammer mechanisms which include a pneumatic cylinder in which a percussion piston is arranged. The percussion piston is displaceable by the compressed air and periodically applies axial blows to a die member which transmits the blow to a tool secured in the chuck of the hand-held drill. In the known compressed air-operated hammer mechanisms, a reversing valve is provided between the pneumatic cylinder and the source of the compressed air, e.g., a compressor located in the drill housing. The reversing valve provides for alternating supply of the compressed air to the pneumatic cylinder and the discharge of the compressed air from the pneumatic cylinder for reciprocating the percussion piston in the pneumatic cylinder chamber. The operation of the reversing valve is controlled by end switches which are actuated in front and rear end positions of the percussion piston. The switching of the reversing valve proper is then effected by appropriate mechanical, electrical means or by communicating to the reversing valve the compressed air through control conduits.

The drawback of the known compressed air-operated hammer mechanisms consists in that they have a large dead volume which must be reloaded between each pressurized condition of the pneumatic cylinder and each unpressurized condition of the pneumatic cylinder. This adversely affects timely deceleration of the percussion piston and, thereby, a predetermined blow frequency. Further, the permanent reloading of the large dead volume leads to large energy losses. The known compressed-air operated hammer mechanisms have at least one reversing valve and several end switches. Such an arrangement causes a time delay in switching from one condition of the reversing valve to another condition thereof, which adversely affects the blow power. Further, the energy of a single blow and the frequency of the generated axial blows can only be controlled by the pressure acting on the hammer mechanism to a very small extent.

Accordingly, an object of the present invention is to eliminate the drawbacks of conventional compressed air-operated hammer mechanisms and to provide a hammer mechanism in which the time delay in switching of the pneumatic cylinder between its pressurized and unpressurized conditions is eliminated to a most possible extent.

Another object of the present invention is to provide a hammer mechanism in which the energy necessary for reloading of the dead volume is reduced, and the energy balance for generating axial blows is substantially improved.

A further object of the present invention is to provide a hammer mechanism which would provide greater possibilities for adjusting the energy of single blows and the blow frequency.

SUMMARY OF THE INVENTION

These and other objects of the present inventions, which will become apparent hereinafter, are achieved by providing a hand-held drill including a housing, a chuck provided at a front, in a drilling direction, end of the housing for receiving a drill or chisel tool, a rotary drive arranged inside the housing for driving the chuck, together with the drill or chisel tool receivable in the chuck, and a compressed air-operated hammer mechanism for generating axial blows to be applied to the drill or chisel tool. The hammer mechanism has a pneumatic cylinder with at least one inlet opening and at least one discharge opening, a die member for imparting the axial blows, which are generated by the hammer mechanism, to the drill or chisel tool and extending through a front limiting surface of the pneumatic cylinder, and a percussion piston displaceable in the pneumatic cylinder upon being impinged by compressed air for intermittently applying axial blows to the die member. A reversing valve connects the hammer mechanism with a source of compressed air. The reversing valve is integrated in the percussion piston and has a plurality of recesses and bores alternatively operationally connectable with the at least one inlet opening and the at least one discharge opening of the pneumatic cylinder for feeding the compressed air into the pneumatic cylinder and for discharging the compressed air therefrom.

Because the reversing valve forms an integral part of the percussion piston, the reversing valve is located within the working volume of the pneumatic cylinder. Further, a pressure is permanently applied to the inlet opening of the pneumatic cylinder. The discharge opening of the pneumatic cylinder serves only for discharging the compressed air from the pneumatic cylinder. The recesses and bores, which are formed in the reversing valve, permits to reduce the dead volume which has to be reloaded between the pressurized and unpressurized conditions of the pneumatic cylinder at each complete stroke of the percussion piston. The reduction of the reloadable dead volume permits to reduce the energy necessary for reloading and improves the general energy balance of generation of axial blows. The present invention also reduces the number of necessary conduits, connections and parts due to the fact that the valving function is now performed by the percussion piston itself instead of a separate reversing valve that was the case in the prior art hammer mechanisms. The time delay of switching is eliminated due to the fact that the percussion piston functions as its own end switch.

In accordance with an advantageous embodiment of the present invention, the percussion piston includes an integrated switch piston which forms the reversing valve and which is displaceable between two end pistons for alternatively directing the compressed air into the working chamber of the pneumatic cylinder and discharging the compressed air therefrom. In this embodiment, the percussion piston forms the valve housing in which a cylindrical reversing element, the switch piston, is axially displaceable.

Because the switch piston extends beyond the rebound surface of the percussion piston during the forward stroke of the percussion piston and beyond the rear surface of the percussion piston during the return stroke of the percussion piston, and, respectively, engages the front and rear surfaces of the pneumatic cylinder, the switch piston acts as an end switch for a respective end position of the percussion piston. Thereby, the time delay during switching is eliminated as the switch piston also functions as a reversing valve, and no time delay takes place between the actuation of the end switch and the valve, as it was the case in the prior art hammer mechanisms in which the end switches and the valve were separate elements. Because the switch piston extends beyond the end surface of the percussion piston, it engages the front or rear surface of the pneumatic cylinder before the percussion piston reaches its respective end position, so that the switching between the pressurizing and unpressurizing positions of the switch piston takes place simultaneously with the percussion piston reaching its respective end position. Thus, the reversing of the direction of movement of the percussion piston is used for simultaneous mechanical reversing of the position of the switch piston, i.e., the reversing valve.

Advantageously, a spring is provided in the space between the rear surface of the percussion piston and the rear wall of the pneumatic cylinder. During the rearward stroke of the percussion piston, the spring absorbs the energy of the percussion piston and thereby contributes to acceleration of the percussion piston during its forward stroke toward the die member. Upon deceleration of the percussion piston during its rearward movement, the movement energy of the percussion piston is stored in the spring which releases the stored energy during the forward stroke of the percussion piston.

In accordance with one embodiment of the present invention, the rear wall of the pneumatic cylinder is formed by an adjustable plate the axial position of which in the pneumatic cylinder can be changed. The changeability of the position of the rear wall-forming plate permits to easily adjust the stroke of the percussion piston. The changeability of the axial position of the adjustable plates permits to easily adjust the frequency of the generated blows and the energy of a single blow, without a need in using additional pressure. By increasing the distance between the die member and the rear wall-forming plate, the stroke of the percussion piston can be increased. The increase in stroke results in the increase of energy of a single blow and in a reduced frequency of the blows. The reduction of the stroke of the percussion piston is achieved by the reduction of the distance between the die member and the rear wall-forming plate. This, in turn, causes a reduction in the energy of a single blow and an increase of the blow frequency.

Advantageously, the axial position of the adjustable plate, which forms the rear wall of the pneumatic cylinder, is continuously adjusted. To this end, the pneumatic cylinder can be provided, e.g., with an inner thread, with the adjustable plate being provided on its circumference with a corresponding outer thread. The stroke adjustment is effected by screwing the plate into the pneumatic cylinder a desired distance.

In a further advantageous embodiment of the present invention, the axial position of the plate is adjusted automatically. The adjustment of the adjustable plate can be effected dependent on predetermined criteria during the operation of the hand-held drill.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
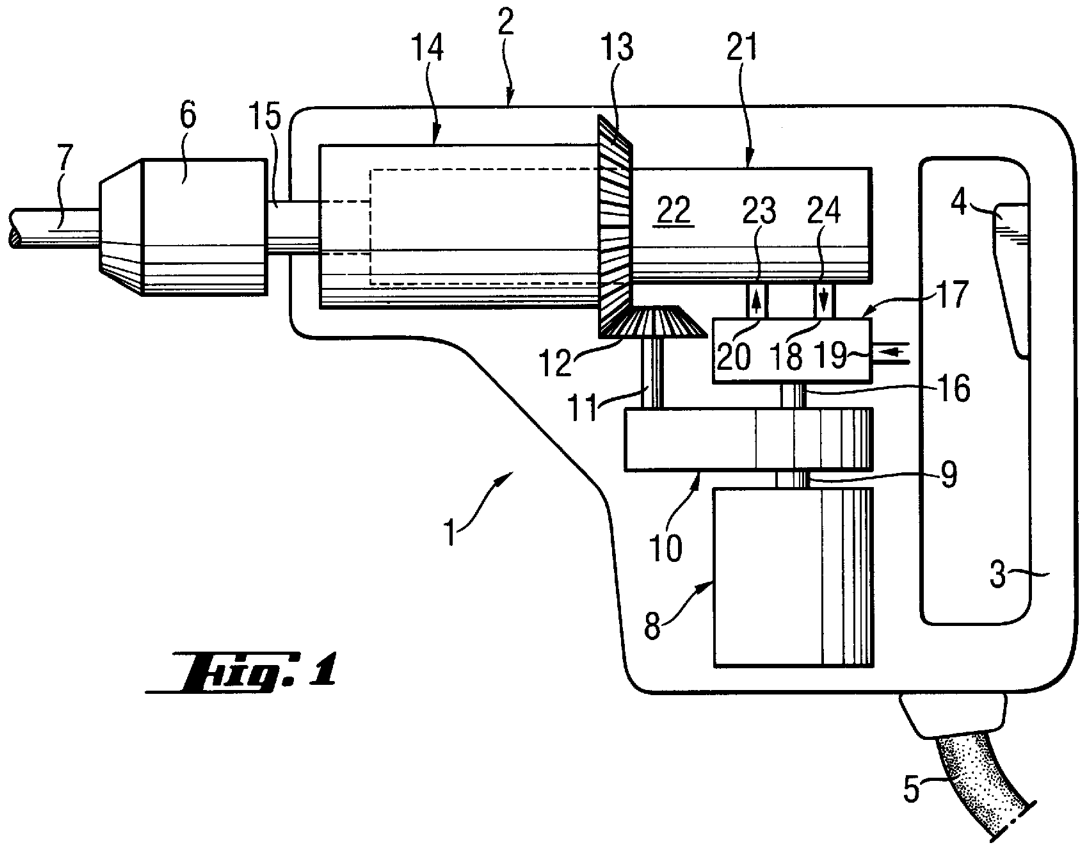
FIG. 1 shows a schematic view of a hand-held drill according to the present invention.

A hand-held drill according to the present invention, the schematic view of which is shown in FIG. 1, is generally designated with a reference numeral 1. The drill has a housing 2 and a handle 3 provided with a main trigger 4 for actuating the drill 1. The feeding of an electrical current to electric components, which are arranged in the housing 2, is effected via an electrical conductor 5. At a side of the housing 2 opposite the handle 3, there is provided a chuck 6 in which a drill or a chisel tool is received. The tool is designated with a reference numeral 7. Inside the housing 2, there is arranged an electric motor 8. The drive shaft 9 of the electric motor 8 is connected with a drive gear mechanism 10 having two outputs. One of the outputs of the drive gear mechanism 10 serves for rotating the tool 7 received in the chuck 6. To this end, the output drive shaft 11 of the drive mechanism 10 carries a bevel gear 12 which is engaged with a circumferential toothing 13 of a spindle 14. A torque of the rotatable spindle 14 is transmitted, via a transmission member 15, to the chuck 6 and the tool 7 received in the chuck 6.

A second output shaft 16 of the drive gear mechanism 10 drives a compressor 17 which generates air pressure. The outlet 20 of the compressor 17 is connected with a bore 23 of a pneumatic cylinder 22 of an air pressure-operated hammer mechanism 21 which is preferably arranged within the spindle 14 coaxially therewith. The inlet 18 of the compressor 17 is connected with a bore 24 of the pneumatic cylinder 22. For compensation of leakage, the compressor 17 is provided with a further air input 19. The axial blows, which are generated by the hammer mechanism 21, are transmitted to the tool 7, which is secured in the chuck 6, via a die member. Advantageously, the die member is formed by the transmission member 15 which in addition to the torque transmission, transmits axial blows.

Figure 2:
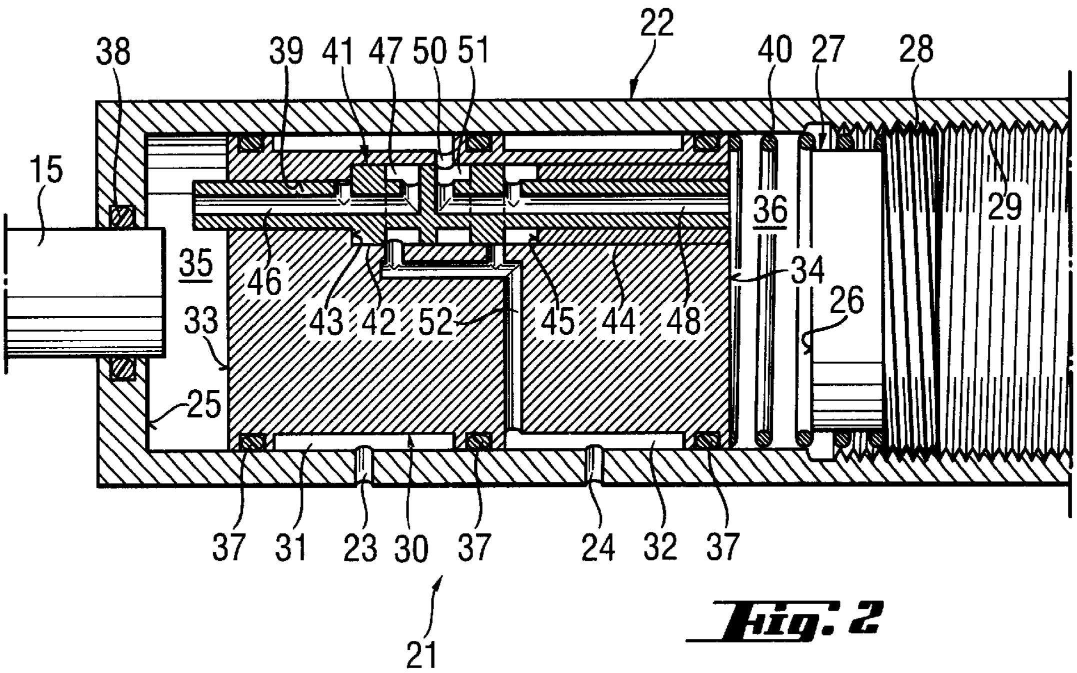
FIG. 2 shows an axial cross-sectional view of an air pressure-operated hammer mechanism used in a hand-held drill according to the present invention.

A schematic axial cross-sectional view of the air pressure-operated hammer mechanism 21 is shown in FIG. 2. The pneumatic cylinder 22 has a discharge bore 24 connected with a source of compressed air, e.g., a compressor. The working chamber of the pneumatic cylinder 22 is limited by front and rear limiting surfaces 25 and 26, respectively. The die member 15 extends through the front surface 25 into the working chamber of the pneumatic cylinder 22. As it has already discussed above, the die member 15 also functions as a torque transmission member and provides thereby for rotation of the tool 7 received in the chuck 6. A sealing 38 seals the working chamber of the pneumatic cylinder 22 in the region of the front surface 25 in which the die member 15 extends. The rear surface 25 advantageously is formed by an adjustable plate 27 having an outer thread 28. The end section of the pneumatic cylinder 22, which is located remotely from the die member 15, is provided with an inner thread 29. The volume of the working chamber of the pneumatic cylinder 22 is changed by adjusting the position of the adjustable plate 27. The adjustment of the position of the adjustable plate 27 can be effected, when needed, manually. In an advantageous embodiment of the invention, the adjustable plate 26 is adjusted automatically, e.g., with an adjusting motor, dependent on predetermined criteria. The adjustment of the plate 27 can be effected, e.g., during the operation of the drill to conform the impact energy of separate blows to the blow frequency of the blows generated by the hammer mechanism.

The working chamber of the pneumatic cylinder 22 is separated by a percussion piston 30 into a front pressure chamber 35 and a rear pressure chamber 36. The front pressure chamber 35 extends between a front rebounding surface 33 of the percussion piston 30 and the front surface 25 of the pneumatic cylinder 22. The rear pressure chamber 36 is limited axially by a rear surface 34 of the percussion piston 30 and the rear surface 26 defined by the adjustable plate 27. The percussion piston 30 has a symmetrical outer contour. Two recesses, which are provided on the circumference of the percussion piston 30 define, together with the cylindrical wall of the housing of the pneumatic cylinder 22, front and rear annular grooves 31 and 32, respectively. Sealing rings 37, which are provided in the circumferential surface of the percussion piston 30, seal the grooves 31 and 32 relative to each other and relative to the front and rear pressure chambers 35 and 36, respectively. A helical spring 40 is provided in the rear pressure chamber 36. In the embodiment shown in the drawings, the spring 40 is supported against the adjustable plate 27. The spring 40 is compressed between the adjustable plate 27 and the rear surface 34 of the percussion piston 30.

A switch piston 41 is arranged in an axial stepped core 39 formed in the percussion piston 30. The switch piston 41 is axially displaceable and has an axial length greater than the axial length of the percussion piston 30. The switch piston 41 is formed as a symmetrical body and has a middle section 42 having an increased diameter. The axial displacement of the switch piston 41 is limited by stop shoulders defined by the middle section 42. The front stop shoulder 43 is formed by a shoulder of the stepped core 39 of the percussion piston 30. The rear stop shoulder 45 is formed by a surface of a sleeve 44 which surrounds the rear section of the switch piston 41 and which is secured in the stepped bore 39 by being screwed-in or by being press-fit in the bore 39. The axial distance between the stop shoulders 43 and 45 is greater than the axial extent of the middle section 42, and the stop shoulder 43 and 45 limit the axial displacement of the switch piston 41 arranged inside of the percussion piston 30. The switch piston 41 is provided with bores and annular grooves which, together with the annual grooves 31, 32 and control bores formed in the percussion piston 30, perform an integrated ventilation function and an end point changeover.

Figure 3:
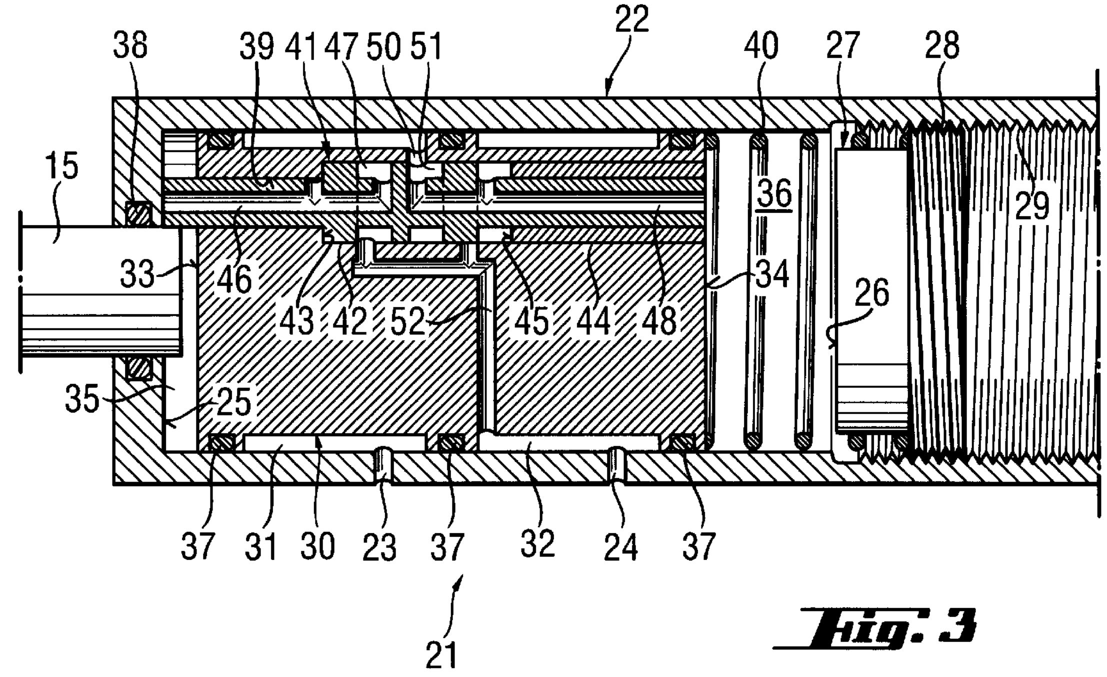
FIGS. 3–6 show the hammer mechanism shown in FIG. 2 in different positions of the percussion piston.
Figure 4:
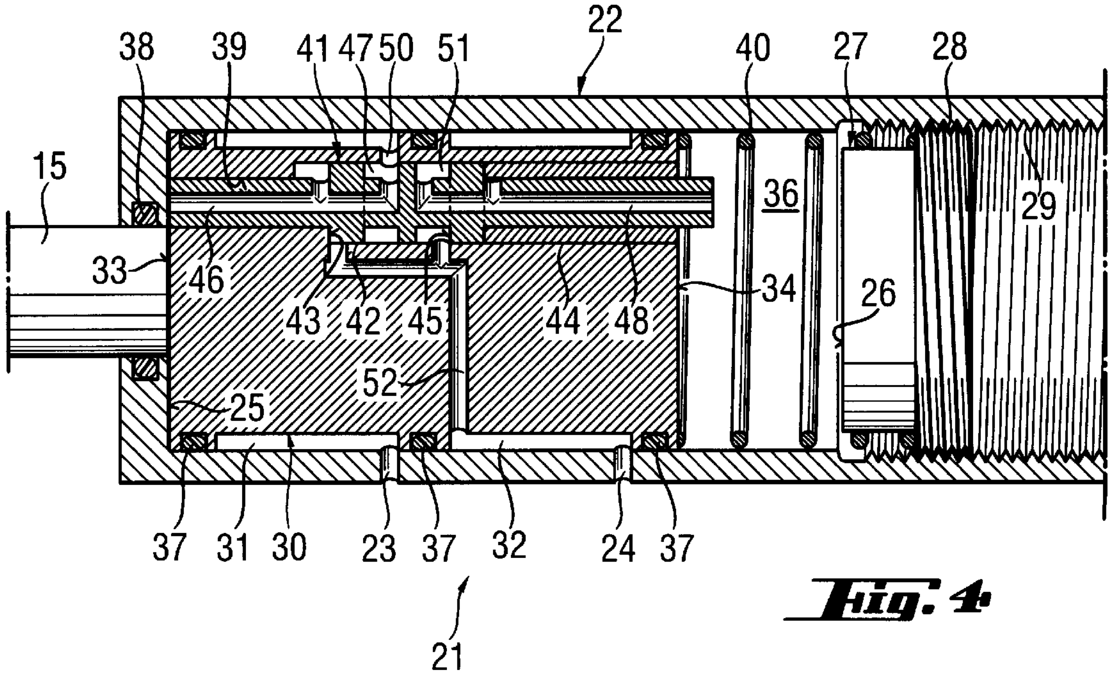

The arrangement of the bores and annual grooves in the switch piston 41, together with commutation of the delivery and discharge bores 23 and 24 of the pneumatic cylinder 22 with the control bores in the percussion piston 30, and their respective functions will now be explained in detail with reference to FIGS. 3–6. FIGS. 3–4 show the percussion piston 30 in its for stroke position in a direction toward the die member 15. The switch piston 41 is provided with axial blind bores 46 and 48 the mouths of which open into the front and rear pressure chambers 35 and 36, respectively. The axial blind holes 46 and 48 communicate with valve chambers 47 and 51 which are formed as recesses on the circumference of the increased diameter, middle section 42. A connection bore 50 connects the front annular groove 31 of the percussion piston 30 with the stepped bore 39. The compressed air, which is fed through the feed opening 23 of the pneumatic cylinder 22, is permanently fed to the annular groove 31, and the rear annular groove 32 is permanently connected with the discharge bore 24.

As shown in FIG. 3, the compressed air, which is delivered to the front annular groove 31, is fed to the rear pressure chamber 36 via the connection bore 50 in the valve chamber 51 and via the blind bore 48. Thereby, the percussion piston 30 is accelerated in a direction toward the die member 15. The front pressure chamber 35 is deaerated via the blind bore 46, the valve chamber 47, a control bore 52 formed in the percussion piston 30, and the discharge opening 24 of the pneumatic cylinder 22. FIG. 3 shows the percussion piston 30 in a position in which the rebound surface 33 of the piston 30 is rebound against the die member 15. The switch piston 41, which has a greater length than the percussion piston 30, has its end projecting beyond the rebound surface 33 of the piston 30 and engaging the front surface 25 of the pneumatic cylinder 22. Upon further forward movement of the percussion piston 30, an axial displacement of the switch piston 41 and reversing of the integrated valve takes place.

FIG. 4 shows a condition in which the percussion piston 30 reaches its forward end position, and the switch piston has been completely axially displaced. In this position, the rear end of the switch piston 41 extends beyond the rear surface 34 of the percussion piston 30, and the compressed air can flow through the bore 23, the front annular groove 31, the connection bore 50, the valve chamber 47 and the front blind bore 46 of the switch piston 41. Through the mouth of the blind bore 46, the compressed air is discharged from the front pressure chamber 35 which is formed between the front surface 25 of the pneumatic cylinder 22 and the rebound surface 33 of the percussion piston 30. In a condition shown in FIG. 4, the front pressure chamber 35 is completely closed. The kinetic energy of the percussion piston 30 is transmitted to the die member 15. Upon engaging the die member 15, the percussion piston 30 immediately rebounds therefrom, and the front pressure chamber 35 again opens and can be filled with the compressed air. As a result, the percussion piston 30 is displaced toward the adjustable plate 27 against a biasing force of the helical spring 40, which is located in the rear pressure chamber 46. The air from the rear pressure chamber 36 is discharge through the rear blind bore 48, the valve chamber 51, the control bore 52, the rear annular groove 32 and the discharge opening 24 of the pneumatic cylinder 22.

Figure 5:
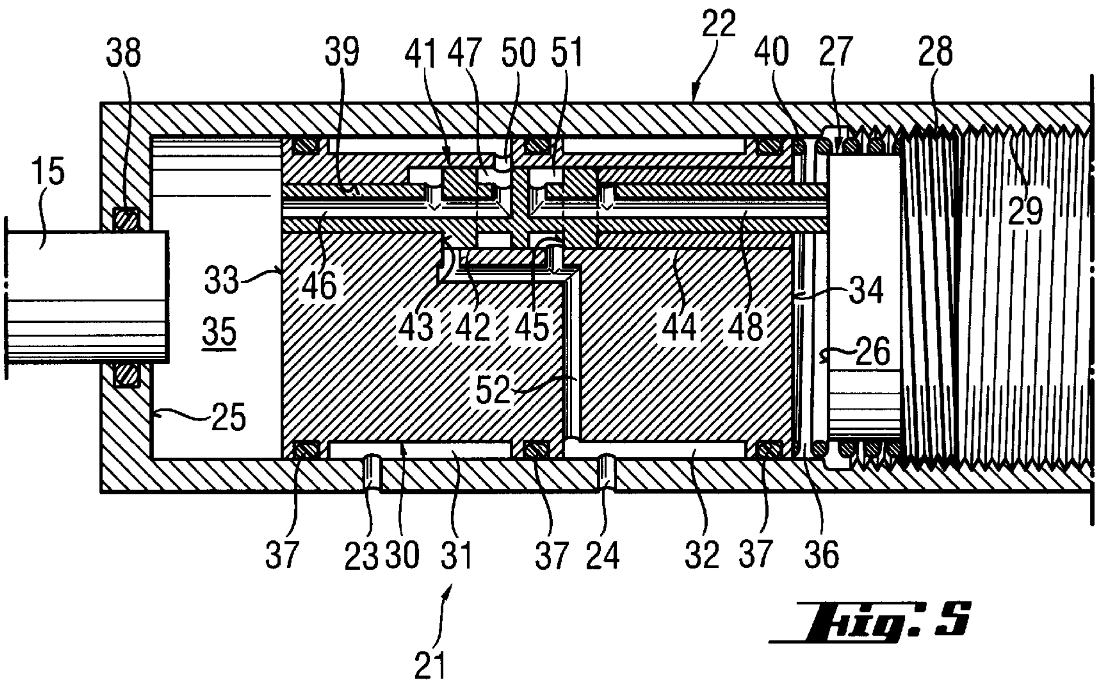

FIG. 5 shows the position of the percussion piston 30 during its rearward stroke just before the piston 30 reaches its rear end position. The rear pressure chamber 36 is almost completely closed. The spring 40 is compressed between the rear surface 34 of the percussion piston 30 and the adjustable plate 27. The spring 40 functions as an energy accumulator during the rearward movement of the percussion piston 30. The front pressure chamber 35 is almost completely open. The filling and the discharge of the front and rear pressure chambers 35 and 36 is effected according to the sequence which was explained on the basis of FIG. 4. In the position shown in FIG. 5, the rear end of the switch piston 41 extends beyond the rear surface 34 of the percussion piston 30 and engages the rear surface 26 of the pneumatic cylinder 22. The switching of the valve takes place automatically upon the percussion piston having reached its dead point position.

Figure 6:
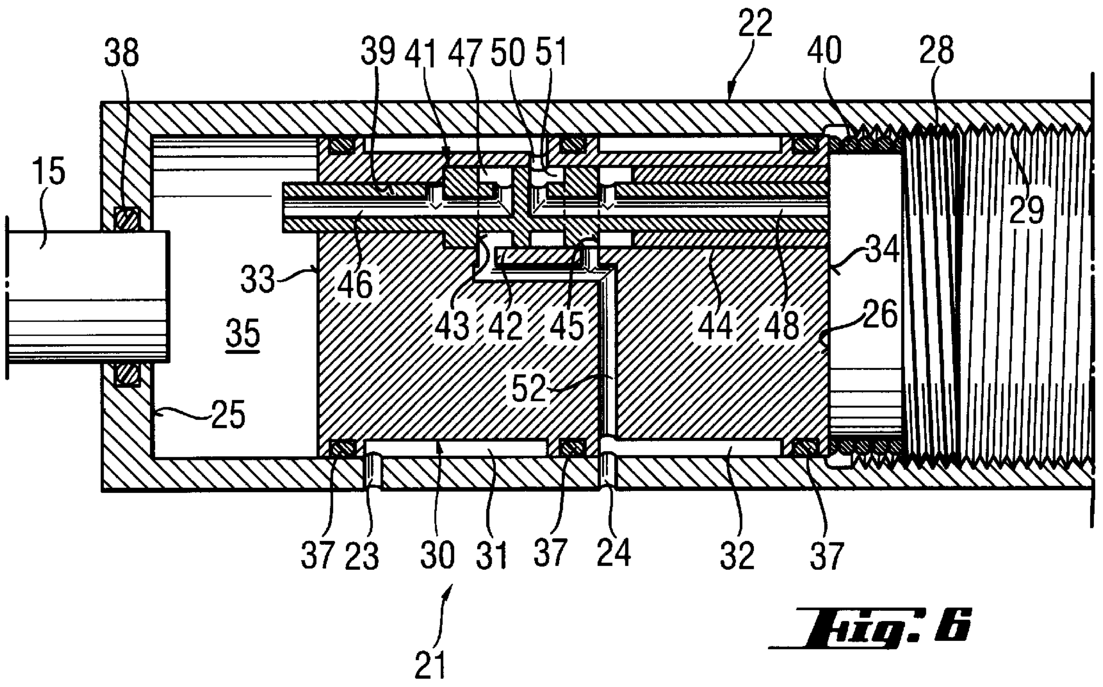

FIG. 6 shows the percussion piston 30 in its rear dead point position. The switching process is completed by axial displacement of the switch piston 41, and the valve is automatically reversed. The helical spring 40 is in a condition of its maximum compression. Upon being released, the spring 40 contributes to the acceleration of the percussion piston 40 in a direction toward the die member 15, releasing its accumulated energy. As a result of the axial displacement of the switch piston 41, the compressed air, is fed through the inlet bore 23, the front annular groove 31, the connection bore 50, and the blind bore 48 into the rear pressure chamber 36, causing acceleration of the percussion piston 30 in the direction of the die member 15. The front pressure chamber 35 is again deaerated via the blind bore 46, the valve chamber 47, the control bore 52, the rear annular space 32, and the discharge opening 24 of the pneumatic cylinder 22.

The advantage of the integration of the reversing valve into the percussion piston consists in that the valving function and the displacement reversing function are effected by one member. The occurrence of the end position and switching take place simultaneously. As a result, retardation of the switching action is eliminated. In the embodiment of the hand-held drill according to the present invention which is shown in the drawings, the energy accumulation during the rearward displacement of the percussion piston is effected by using a spring, in particular a helical spring. Thereby, a continuous supply of energy from a compressor can take place during both the forward stroke and the return stroke of the percussion piston. Additional pressure accumulators are not needed. The energy accumulation can also be effected due to air cushion provided between the rear surface of the percussion piston and the rear surface of the pneumatic cylinder. To this end, it is sufficient when the rear surface of the pneumatic cylinder has, in the region of the mouth of a respective blind bore formed in the switch piston, appropriate recesses. The recesses enable filling of the rear pressure chamber with compressed air during the switching of the percussion piston movement, thus preventing a complete closure of the rear pressure chamber at the rear dead point. As it has already been explained above, that compressed air can be produced using an electrical drive and a compressor. It is to be pointed out that the hammer mechanism according to the present invention can be used in hand-held drills provided with a compressed air accumulator for driving the percussion piston. In accordance with another embodiment of the present invention, the entire hand drill can be operated with a source of compressed air. In his case, both the rotational drive of the tool and operation of the hammer mechanism is effected by using the compressed air source, e.g., a compressed air conduit.

Though the present invention has been shown and described with reference to a preferred embodiment, such is merely illustrative of the present invention and is not to be construed as to be limited to the disclosed embodiment and/or details thereof, and the present invention includes all modifications, variations and/or alternate embodiments within the sprint and scope of the present invention as defined by the appended claims.

What is claimed is:

1. A hand-held drill, comprising a housing (2); a chuck (6) provided at a front, in a drilling direction, end of the housing (2) for receiving one of a drill or chisel tool (7); a motor a rotary drive (8–15) arranged inside the housing for driving the chuck, together with the one of drill and chisel tool receivable in the chuck; a compressed air-operated hammer mechanism (21) for generating axial blows to be applied to the one of drill and chisel tool; and a compressor driven by the motor for providing of compressed air (17) communicating with the hammer mechanism, the hammer mechanism having a pneumatic cylinder (22) with at least one inlet opening (23) and at least one discharge opening (24), a die member (15) for imparting the axial blows, which are generated by the hammer mechanism, (21), to the one of drill and chisel tool and extending through a front limiting surface (25) of the pneumatic cylinder (22), and a percussion piston (30) displaceable in the pneumatic cylinder (22) upon being impinged by compressed air for intermittently applying axial blows to the die member (15), and a reversing valve for connecting the hammer mechanism (21) with the source of compressed air, integrated in the percussion piston (30), and having a plurality of recesses and bores (46–52) alternatively operationally connectable with the at least one inlet opening (23) and the at least one discharge opening (24) of the pneumatic cylinder (22) for feeding the compressed air into the pneumatic cylinder (22) and for discharging the compressed air therefrom, wherein the reversing valve has opposite ends which extend, in forward and rearward stroke positions of the percussion piston (30), beyond a rebound surface (33) and a rear surface (34) of the percussion piston (30), respectively, and engage the front limiting surface (25) and a rear limiting surface (26) of the pneumatic cylinder (22), respectively.

2. A hand-held drill as set forth in claim 1, wherein the reversing valve comprises a switch piston (41) axially displaceable between two end positions, whereby the reversing valve is switched between feeding and discharge positions thereof.

3. A hand-held drill as set forth in claim 1, wherein a compressible helical spring (40) is arranged in a rear pressure chamber (36), which is formed between the rear surface (34) of the percussion piston (30) and the rear limiting surface (26) of the pneumatic cylinder (22), for storing energy, which is generated during the rearward stroke of the percussion piston (30) and for applying additional acceleration to the percussion piston (30) during the forward stroke of the percussion piston.

4. A hand-held drill as set forth in claim 1, further comprising an adjustable plate (27) located in the pneumatic cylinder (22) and forming the rear surface (26) of the pneumatic cylinder (22), and means for changing an axial position of the adjustable plate (27) in the pneumatic cylinder (22).

5. A hand-held drill as set forth in claim 4, wherein the axial position of the adjustable plate (27) is changed continuously.

6. A hand-held drill as set forth in claim 4, wherein the axial position of the adjustable plate (27) is changed during the operation of the drill.

* * * * *